(12) United States Patent
Gegner et al.

(10) Patent No.: US 9,322,074 B2
(45) Date of Patent: Apr. 26, 2016

(54) ROLLING-ELEMENT BEARING AND METHOD OF MANUFACTURING THEREOF

(71) Applicants: Juergen Gegner, Forchheim (DE); Wolfgang Nierlich, Schweinfurt (DE); Armin Herbert Emil August Olschewski, Schweinfurt (DE); Arno Stubenrauch, Aidhausen (DE)

(72) Inventors: Juergen Gegner, Forchheim (DE); Wolfgang Nierlich, Schweinfurt (DE); Armin Herbert Emil August Olschewski, Schweinfurt (DE); Arno Stubenrauch, Aidhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/166,226

(22) Filed: Jan. 28, 2014

(65) Prior Publication Data

US 2014/0212082 A1 Jul. 31, 2014

(30) Foreign Application Priority Data

Jan. 28, 2013 (DE) .......................... 10 2013 201 321

(51) Int. Cl.

| | |
|---|---|
| *C21D 9/40* | (2006.01) |
| *F16C 33/64* | (2006.01) |
| *F16C 33/58* | (2006.01) |
| *F16C 33/30* | (2006.01) |
| *F16C 33/56* | (2006.01) |
| *F16C 33/62* | (2006.01) |

(52) U.S. Cl.
CPC . *C21D 9/40* (2013.01); *F16C 33/30* (2013.01); *F16C 33/303* (2013.01); *F16C 33/56* (2013.01); *F16C 33/58* (2013.01); *F16C 33/62* (2013.01); *F16C 33/64* (2013.01); *F16C 2223/10* (2013.01)

(58) Field of Classification Search
CPC .... F16C 2208/36; F16C 33/303; F16C 33/56; F16C 33/565; F16C 33/62; F16C 33/64; F16C 33/21; F16C 33/58; F16C 33/583; F16C 33/14; F16C 33/30; F16C 2223/10; C21D 9/40; C21D 6/02; C21D 6/04; C21D 7/00; C21D 7/02; C21D 7/04; C21D 7/06; C21D 7/08; C21D 7/13; C21D 8/00; C21D 8/005; C21D 8/0205; C21D 8/0278
See application file for complete search history.

(56) References Cited

U.S. PATENT DOCUMENTS

| | | | |
|---|---|---|---|
| 2,202,773 | A | 5/1940 | Given |
| 3,737,204 | A * | 6/1973 | Burkhardt ..................... 384/569 |
| 3,920,488 | A | 11/1975 | Pitton |
| 5,104,463 | A | 4/1992 | Menke |
| 6,048,414 | A | 4/2000 | Tsushima et al. |

(Continued)

FOREIGN PATENT DOCUMENTS

| | | |
|---|---|---|
| DE | 2419819 | 12/1974 |
| DE | 202008017091 U1 | 3/2009 |

(Continued)

*Primary Examiner* — Alan B Waits
(74) *Attorney, Agent, or Firm* — Bryan Peckjian; SKF USA Inc. Patent Dept.

(57) ABSTRACT

A rolling-element bearing includes an inner ring made of steel and having an inner-ring raceway, an outer ring having an outer ring raceway, and ceramic rolling elements which roll on the inner-ring raceway and on the outer-ring raceway. The inner ring has been subjected to a heat treatment to harden it. The heat treatment is concluded with the performance of a final heat-treatment step at a predetermined temperature. In the inner ring, compressive residual stresses are formed in an outer layer by cold working in the region of the inner-ring raceway. The inner ring also has been subjected to a bluing treatment.

11 Claims, 2 Drawing Sheets

(56) References Cited

U.S. PATENT DOCUMENTS

| | | | |
|---|---|---|---|
| 6,309,476 B1 | 10/2001 | Ravenscroft et al. | |
| 6,531,000 B1 * | 3/2003 | Takemura et al. | 148/286 |
| 7,004,637 B1 | 2/2006 | Uyama et al. | |
| 7,144,545 B2 | 12/2006 | Gegner | |
| 7,163,650 B2 * | 1/2007 | Gegner | 264/29.6 |
| 7,249,892 B2 * | 7/2007 | Takemura et al. | 384/450 |
| 7,396,422 B2 * | 7/2008 | Miyauchi | 148/334 |
| 7,435,308 B2 * | 10/2008 | Tanaka et al. | 148/334 |
| 7,950,858 B2 * | 5/2011 | Norimatsu et al. | 384/544 |
| 8,454,241 B2 * | 6/2013 | Uchida et al. | 384/492 |
| 8,793,878 B2 * | 8/2014 | Gegner et al. | 29/898.066 |
| 2002/0064326 A1 * | 5/2002 | Tanaka | 384/492 |
| 2011/0212808 A1 * | 9/2011 | Pabst | 475/348 |
| 2013/0016938 A1 | 1/2013 | Okada et al. | |
| 2013/0089283 A1 | 4/2013 | Trojahn et al. | |
| 2013/0251298 A1 | 9/2013 | Gegner et al. | |

FOREIGN PATENT DOCUMENTS

| | | |
|---|---|---|
| DE | 102007061193 | 6/2009 |
| DE | 102009023818 A1 | 12/2010 |
| DE | 102011077214 A1 | 12/2011 |
| DE | 102010031439 A1 | 1/2012 |
| DE | 102011006296 A1 | 10/2012 |
| EP | 0105540 | 4/1984 |
| EP | 1310469 A2 | 5/2003 |
| EP | 1331211 A2 | 7/2003 |
| EP | 1505306 A1 | 2/2005 |
| GB | 2315525 A | 2/1998 |
| JP | H03-184839 | 8/1991 |
| JP | 03329048 A | 11/2003 |
| WO | 2006012895 A1 | 2/2006 |
| WO | 2009065515 A2 | 5/2009 |

\* cited by examiner

ROLLING-ELEMENT BEARING AND METHOD OF MANUFACTURING THEREOF

CROSS-REFERENCE

This application claims priority to German patent application no. 10 2013 201 321.3 filed on Jan. 28, 2013, the contents of which are incorporated herein by reference.

TECHNICAL FIELD

The present disclosure generally relates to rolling-element bearings and to methods for manufacturing such rolling-element bearings

RELATED ART

In particular with rolling-element bearings which are subjected to complex loading patterns, such as for example rolling-element bearings in industrial transmissions of wind turbines, cranes, or mills as well as paper machines and ship's reversing gearboxes, premature failures often occur, e.g., at between 1% and 25% of the nominal $L_{10}$ lifespan (based on 90% reliability). In view of the high costs of the rolling-element bearings themselves (usually larger roller bearings), the repair costs (e.g. offshore wind turbines) and the high costs caused by a shutdown of systems equipped with such rolling-element bearings, a longer, more problem-free operation and thus a longer service life of the rolling-element bearings is urgently required to achieve economical (cost-effective) operation.

It has therefore been necessary in the past to furnish the rolling-element bearings with exceptional material properties that are custom-tailored to the expected load profile, insofar as it was known and possible.

Thus, there is a long-felt need to provide a rolling-element bearing which has a long service life and a low risk of premature failure, even in operations involving extreme loading situations.

SUMMARY

In one aspect of the present teachings, a method for manufacturing a rolling-element bearing, which includes an inner ring having an inner-ring raceway, an outer ring having an outer-ring raceway, and rolling elements which roll on the inner-ring raceway and on the outer-ring raceway, is disclosed. The method may involve the following features and/or steps.

The inner ring is manufactured from steel and subjected to a heat treatment to harden it, which heat treatment is concluded with the performance of a final heat-treatment step at a predetermined temperature. At least in the inner ring, compressive residual stresses are formed in an outer (case) layer through cold working (strain hardening) in the region of the inner-ring raceway; the outer (case) layer extends up to a minimum depth below the surface of the inner-ring raceway. After the cold working, the inner ring is subjected to bluing. The rolling elements are manufactured from a ceramic material.

Insofar as the individual steps of the above-described method relate to the same component of the bearing, they are preferably carried out in the above-mentioned order. However, not all steps need be executed in a close spatial and/or temporal connection. Rather, it is possible to produce intermediate products which will be further processed at a later time and/or at a different location.

If one of the manufacturing methods disclosed herein is utilized, the susceptibility of the steel utilized for the inner ring to surface crack formation is reduced, and the penetration of hydrogen into the inner-ring raceway is also hindered by the compressive residual stresses. In addition, the mass of the rolling elements is reduced as compared to conventional steel rolling elements, whereby the tribological and mechanical behavior, e.g. reduced friction and thus also lesser energy losses, better emergency running (dry running) properties, and lower centrifugal forces, is improved. In particular, the risk of a direct material contact between the rolling elements and the inner-ring raceway without a separating lubricant film (e.g. mixed-friction state) is reduced, and the negative effects of such a direct contact can be mitigated. In addition, a steel-steel contact is prevented.

In particular in cases of extreme surface loading (and/or, e.g. also with contaminated lubricant), these improvement positively affect the lifespan of the rolling-element bearing. The above-described method thus has the advantage that it makes possible the manufacture of rolling-element bearings that can then achieve a very long lifespan, even if they are, for example, briefly exposed to extreme operating conditions, e.g. characterized by high Hertzian pressures and/or slippage conditions. The present methods are thus suitable, e.g., for the manufacture of rolling-element bearings for transmissions of wind turbines.

If the heat treatment is performed, the formation of desired microstructures in the inner ring can be achieved. As a result of the hardening, the inner-ring raceway is reliably protected from mechanical damage and from an unacceptably high amount of wear.

Prior to the cold working, the inner ring optionally can be subjected to a martensitic hardening, case hardening, or induction hardening. In this case, the temperature of the final heat-treatment step can be the tempering temperature of the inner ring.

In the alternative, prior to the cold working, the inner ring optionally can be subjected to a bainitic hardening. In this case the temperature of the final heat-treatment step can be the bainitic transformation temperature of the inner ring.

Between the processing step of the cold working and the additional possible processing step of the bluing, a mechanical surface finishing of the inner ring can be carried out. Such surface finishing enables damaged surface regions of the inner ring to be ablated and/or the surface roughness to be reduced. The surface finishing can be performed, e.g., by honing. A surface finishing by (fine) grinding then only comes into consideration if the removal is so minimal that the effects achieved by the cold working are not severely impaired in an unacceptable manner.

The inner ring can be subjected to a thermal post-treatment. In particular, the thermal post-treatment can be performed at a temperature below the temperature of the final heat-treatment step. This has the advantage that there is no significant loss of hardness. The thermal post-treatment can be carried out after the bluing of the inner ring.

Furthermore, the outer ring can be subjected to a hardening heat-treatment including a final heat-treatment step, a cold working, a bluing treatment, and/or a thermal post-treatment preferably at a temperature below the temperature of the final heat-treatment step. In this case the same heat-treatment method can be used as with the inner ring. Likewise, a method differing from the heat treatment of the heat-treatment of the inner ring can also be used.

The temperature of the thermal post-treatment can be at least 10 K below the temperature of the final heat-treatment step. The thermal post-treatment can be carried out at a temperature of at least 100° C. The post-treatment is particularly effective if this treatment is performed at a temperature that is no more than 100 K below, preferably no more than 50 K below, the temperature of the last heat treatment step. The decrease of the width of the radiographic line can be used as a measure of the effectiveness of the thermal post-treatment. For example, for the full width at half maximum of the {211}-ferrite (martensitic/bainitic) X-ray diffraction line, a decrease of at least 0.05° at at least one location within the mechanically influenced zone (surface and/or depth) can serve as a criterion for an effective thermal post-treatment.

The thermal post-treatment preferably occurs as closely as possible just below the tempering temperature (e.g. 5 to 20 K below) for a not-too-long period of time, e.g., at most 5 hours, that depends on the component thickness and the thickness of the mechanically-influenced outer layer, in order to optimize, without significant loss of hardness or reduction of compressive residual stresses, the stabilization of the microstructure, which is mechanically influenced by the surface treatment and cold working after the heat treatment. Experience has shown that a sufficient duration for the thermal post-treatment, which duration also depends on the temperature, is between 15 minutes and a maximum of two hours. If a bainitic hardening is performed instead of a martensitic-, case-, or induction-hardening, the statements concerning the tempering temperature apply in a corresponding manner for the bainitic transformation temperature.

If bluing is also to be carried out, the thermal post-treatment can be carried out in connection with the bluing such that no appreciable cooling occurs between the bluing and the thermal post-treatment. This condition can be considered to be satisfied if the temperature of the treated component does not fall below a value of 100° C. between the bluing and the thermal post-treatment.

The rolling elements can be manufactured from silicon nitride. Silicon nitride possesses the advantageous property of good cyclical loadability. Likewise, zirconium oxide can also be utilized. For example, the rolling elements can be manufactured from polymer-derived ceramic (polymer ceramic). This has the advantage of a very good shapeability in the plastic state and relatively low manufacturing- and processing costs. With the use of silicon nitride or a suitable polymer ceramic, the mass of the rolling elements, as compared to conventional rolling elements made from steel, can be reduced by more than half.

In another aspect of the present teachings, a rolling-element bearing includes an inner ring having an inner-ring raceway, an outer ring having an outer-ring raceway, and rolling elements which roll on the inner-ring raceway and on the outer-ring raceway. The inner ring is manufactured from steel and hardened by a heat treatment. In the region of the inner-ring raceway, the inner ring has compressive residual stresses formed through cold working in an outer layer which extends up to a minimum depth below the surface of the inner-ring raceway. The surface of the inner-ring raceway can be formed by a blued layer. The rolling elements are manufactured from a ceramic material.

Again, the ceramic material of the rolling elements can be silicon nitride, because it possesses the advantageous property of good cyclical loadability. Likewise, zirconium oxide can also be utilized. For example, the ceramic material of the rolling elements can be manufactured from a polymeric precursor using pyrolysis. Suitable manufacturing methods for such a polymer ceramic are known for example from EP1310469B1 (U.S. Pat. No. 7,144,545) and EP1331211B1 (U.S. Pat. No. 7,163,650), and make possible, with very good molding properties, a relatively economical (cost-effective) manufacture of the rolling elements.

In case the rolling elements are formed of silicon nitride or suitable polymer ceramic, the mass of the rolling elements, as compared to conventional rolling elements made from steel, can be reduced by more than half.

The inner ring can be manufactured from a steel having a sulfur content of 0.002 to 0.015 mass % and an oxygen content less than 15 ppm. The sulfur content can be, e.g., between 0.006 and 0.015 mass %. The oxygen content can be, e.g., less than 10 ppm or even less than 5 ppm. The ppm values are each based on the mass ratio. The inner ring can be, e.g., manufactured from a through-hardened rolling-element bearing steel.

The inner ring can have a residual austenite content from 8 to 18 volume %. Preferably, the residual austenite content can be from 10 to 16 volume %. Such a residual austenite content proves to be favorable under extreme rolling loads, since crack formation and crack growth are impeded.

In the region of the inner-ring raceway, the inner ring can have compressive residual stresses in the outer layer having an absolute value of a minimum value or above, and the minimum value of the absolute value of the compressive residual stresses can be 200 MPa. The minimum depth can be 0.1 mm, in particular 0.2 mm. The minimum value of the absolute value of the compressive residual stresses can be, e.g., 400 MPa or even 500 MPa. At depths greater than the minimum depth, the inner ring can have compressive residual stresses having an absolute value less than the minimum value. For example, the absolute value of the compressive residual stress at depths greater than the minimum depth can decrease with increasing depth, or tensile residual stresses can be present at further increasing distance from the surface, until finally, e.g., at a depth of 0.5 to 1 mm, the heat-treatment level (tensile residual stress or compressive residual stress, depending on the method) is reached. The compressive residual stresses reduce the tendency of the inner ring to crack when subjected to localized friction-induced tensile loads, and thus have the effect of an increased service life of the rolling-element bearing.

In the region of the inner-ring raceway, the inner ring can have compressive residual stresses in the outer layer having an absolute value of a maximum value or below, and the maximum value of the absolute value of the compressive residual stresses can be, e.g., 1500 MPa. For example, the maximum value of the absolute value of the compressive residual stresses can be, e.g., 1000 MPa or only 800 MPa.

The inner ring can have a microstructure in the outer layer, which microstructure is modified by thermal post-treatment. The modified microstructure in the outer layer of the inner ring can have dislocations. Around the nuclei of such dislocations, carbon atoms deposit (segregate) due to static strain aging as a result of the thermal post-treatment (cf. Cottrell atmospheres). This modification energetically stabilizes the microstructure and can be detected by a measurement of the decrease of the width of the radiographic line. For example, with a decrease of at least 0.05° of the full width at half maximum of the {211}-ferrite (martensitic/bainitic) X-ray diffraction line at at least one location within the outer layer, a significant modification of the microstructure can be assumed.

The outer ring can be subjected to bluing.

The rolling-element bearing can include a cage made from a high-temperature plastic. For example, the rolling-element bearing can include a cage made from polyetheretherketone (PEEK).

The rolling-element bearing can be, e.g., a rolling-element bearing of a transmission of a wind turbine or another industrial transmission.

Exemplary embodiments will be described and explained in more detail below with reference to the accompanying Figures. Further objects, advantages, designs and embodiments of the present teachings will be apparent therefrom.

DETAILED DESCRIPTION OF THE INVENTION

Figure 1:
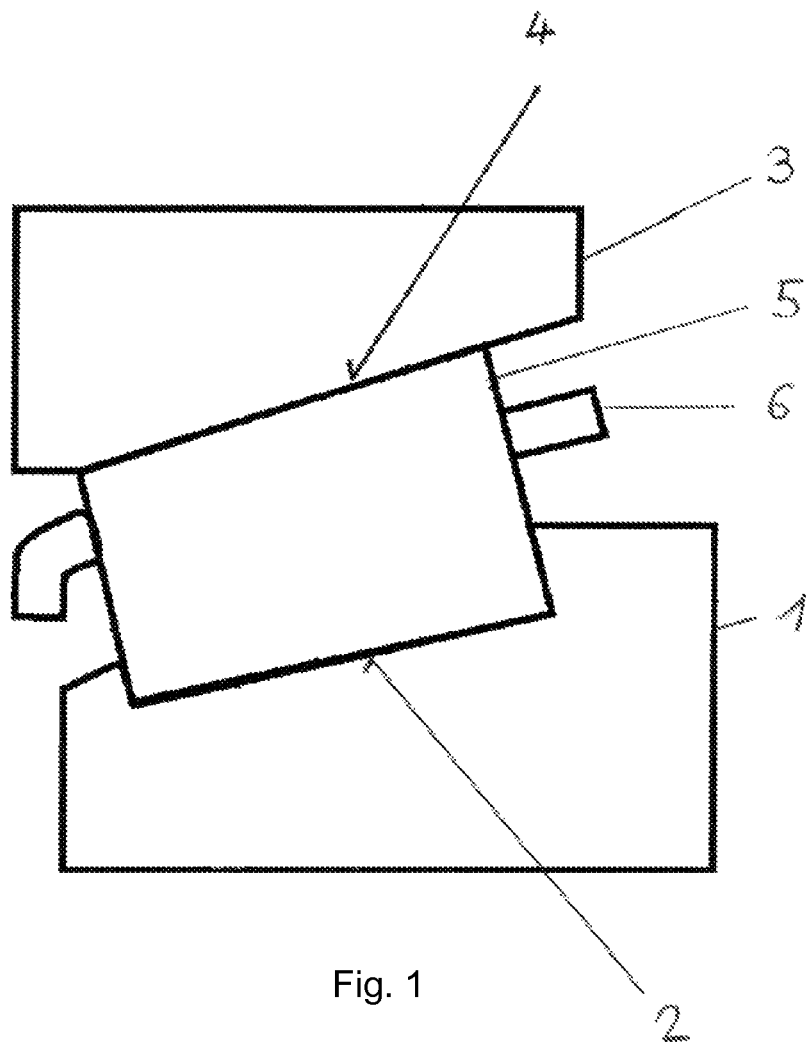
FIG. 1 shows an exemplary embodiment of a representative rolling-element bearing shown in a schematic sectional view.

FIG. 1 shows an exemplary embodiment of a rolling-element bearing in a schematic sectional view. The depicted rolling-element bearing is formed as a tapered roller bearing and includes an inner ring 1 having a conical inner-ring raceway 2 and an outer ring 3 having a conical outer-ring raceway 4. Conical rolling elements 5 roll on the inner-ring raceway 2 and the outer-ring raceway 4. The rolling elements 5 are guided in a cage 6. Such a rolling-element bearing can for example be used in a transmission of a wind turbine.

As an alternative to the depicted exemplary embodiment, the rolling-element bearing can for example also be formed as a cylindrical roller bearing with cylinder-shaped rolling elements 5, or as a ball bearing with balls as rolling elements 5.

The inner ring 1 of the rolling-element bearing can be manufactured from a through-hardened steel, for example from the rolling-element bearing steel 100Cr6. Similarly, the inner ring 1 can be manufactured from a case-hardened steel, for example from the steel 18NiCrMo14-6 or the steel 18CrNiMo7-6. The utilized steel can be manufactured with a very low sulfur content and a very low oxygen content. The sulfur content can be between 0.002 and 0.015 mass %, in particular between 0.006 and 0.015 mass %. The oxygen content can be less than 15 ppm, in particular less than 10 ppm or when possible even less than 5 ppm. The ppm values are each based on the mass ratio.

The inner ring 1 is hardened by a heat treatment. For example a martensitic hardening may be performed. In this case, the process parameters of the austenitization, quenching and tempering performed during the martensitic hardening can be chosen such that a residual austenite content between 8 and 18 volume %, preferably between 10 and 16 volume %, results.

After completion of the heat treatment, the inner ring 1 is subjected to a grinding process. During the grinding process, the inner-ring raceway 2 is formed (provided) with a predetermined geometry and a predetermined surface finish. As a result of the grinding, for example, distortions (warping) arising during the hardening can be compensated for. Honing can also follow the grinding, in order to generate an especially smooth surface with low roughness for good tribological properties.

In a further process step, cold working of the inner ring 1 takes place in the region of the inner-ring raceway 2. Cold working can be performed, e.g., by subjecting the inner ring raceway 2 to shot peening, deep rolling and/or hot oil jets (hot oil peening). To eliminate any surface damage or plastic deformations therefrom, the inner ring raceway 2 can be ground or honed following the cold working. However, a surface finishing by grinding then only comes into consideration if the removal is set so low that the effects achieved by the cold working (in particular compressive residual stress development) are not severely impaired in an unacceptable manner. Cold working by deep rolling results in significantly less surface damage and can reach a significantly greater influence depth than cold working by shot peening. In many cases deep rolling or similar technologies are therefore preferred over shot peening. With cold working by deep rolling, only a limited amount of grinding, or no grinding at all, is required, followed by a honing, if needed. On the other hand, higher compressive residual stresses can be generated in the immediate vicinity of the surface by shot peening than by deep rolling.

As a result of the cold working, compressive residual stresses are generated in an outer (case) layer in the inner ring 1. The compressive residual stresses influence the lifespan of the rolling-element bearing in a very advantageous manner. The size and depth profile of the compressive residual stresses are explained in more detail in an exemplary manner by FIG. 2.

Figure 2:
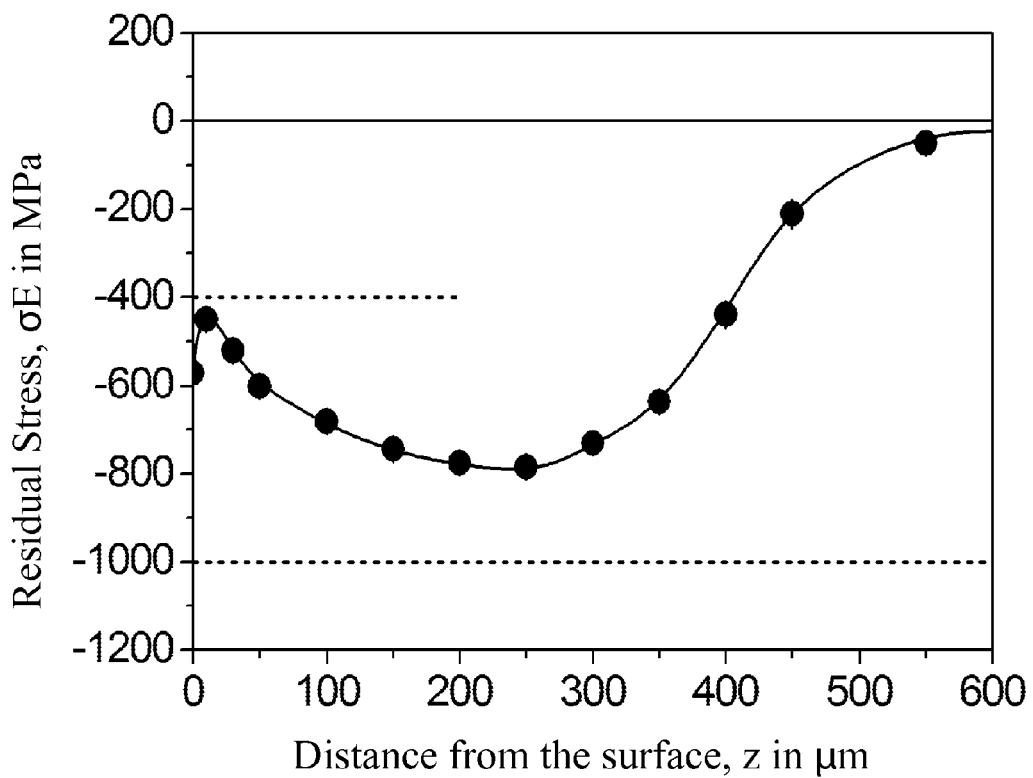
FIG. 2 shows a diagram that illustrates the progression of the compressive residual stresses in an inner ring according to the present teachings.

FIG. 2 shows a diagram illustrating the progression of the compressive residual stresses in the inner ring 1. The depth below the surface of the inner ring raceway 2 is plotted on the abscissa. The value of the residual stress for each depth is plotted on the ordinate. Negative values of the residual stress mean that it is a compressive residual stress; positive values mean that it is a tensile residual stress.

The residual stress has a negative value throughout the entire depicted range, which range can be equated with the aforementioned outer layer, so that there is a compressive residual stress throughout. At the surface of the inner ring raceway 2, the absolute value of the compressive residual stress is slightly under 600 MPa, which represents a typical value after honing. With increasing depth the absolute value of the residual compressive stress decreases first to slightly above 400 MPa at a depth of about 0.01 mm. With further increasing depth the absolute value of the residual compressive stress increases again and at a depth of 0.20 mm to 0.25 mm approaches a value of 800 MPa, however without reaching this value. At even greater depths the absolute value of the compressive residual stress once again continuously decreases.

It has been shown that a long lifespan (service life) of the rolling-element bearing can be achieved if the absolute value of the compressive residual stress at a minimum depth is not less than a minimum value. The minimum depth should be 0.1 mm, preferably 0.2 mm. The minimum value for the absolute value of the compressive residual stress should be 200 MPa, preferably 400 MPa or 500 MPa. At depths greater than the minimum depth, the inner ring 1 can have compressive residual stresses with an absolute value less than the minimum value. For example, the absolute value of the compressive residual stress at depths greater than the minimum depth can decrease with increasing depth. Furthermore the absolute value of the compressive residual stress over the entire depth range preferably should not exceed a maximum value. The maximum value can be, e.g., 1500 MPa, preferably 1000 MPa or even 800 MPa.

After the cold working and a mechanical surface finishing that may be necessary to achieve a suitable roughness, the inner ring 1 can be subjected to bluing (also known as passivation, blackening or black oxide finishing). This is illustrated in the exemplary embodiment. The bluing can occur in a manner that is described in DE 10 2007 061 193 A1 or in U.S. patent application Ser. No. 13/677,860, which is incorporated herein by reference. The blued inner ring 1 is depicted in FIG. 3.

Figure 3:
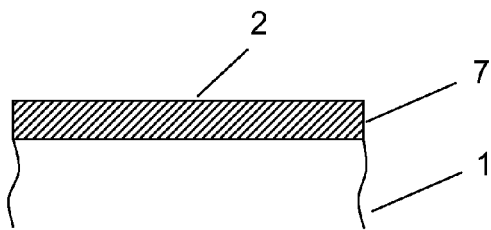
FIG. 3 shows a greatly enlarged detail of the inner ring in the region of the inner-ring raceway in a schematic sectional view.

FIG. 3 shows a greatly enlarged detail of the inner ring in the region of the inner-ring raceway in a schematic sectional view.

The surface of the inner-ring raceway 2 is formed by a thin blued (oxide) layer 7. The thickness of the blued layer 7 can be less than 1 µm or up to a few µm. The blued layer 7 is formed very thick and has a deep black color. In particular, the blued layer 7 is formed so as to be liquid-impermeable.

After cold working and surface treatment, in the exemplary embodiment after optional subsequent bluing, the inner ring 1 is subjected to a thermal post-treatment. The thermal post-treatment is performed at a temperature that is at least 10 K below the tempering temperature of the inner ring 1, for example in the range from 150 to 230° C. In any case a temperature above 100° C. should be selected. The thermal post-treatment is particularly effective if it is performed at a temperature that is at most 100 K, or even better at most 50 K, below the tempering temperature. The temperature of the thermal post-treatment can also be increased to within less than 10 K of the tempering temperature. Then, however, a relatively precise temperature control must be ensured, in order to avoid exceeding the tempering temperature. The structure of the inner ring 1 stabilizes microstructurally as a result of the thermal post-treatment. That is, in a manner similar to Cottrell atmospheres, carbon atoms deposit themselves on dislocations, which form energetically favorable configurations (e.g. dipole, multipole) during the plastic deforming in the cold working and surface machining as a result of the induced sliding processes, and thus stabilize these favorable dislocation arrangements. The processes (e.g. roller fatigue) occurring under a rolling load are thus favorably influenced, i.e. in particular the material-damaging effects of these processes are slowed.

With the performance of the thermal post-treatment, the inner ring 1 is completed and can be used in the assembly of the rolling-element bearing.

A bainitic hardening can be performed as the heat treatment instead of a martensitic hardening. In this case the thermal post-treatment is carried out at a temperature that is at least 10 K below the bainitic transformation temperature. The above statements concerning the temperature limits of martensitic hardening apply here in an analogous manner.

In general, the thermal post-treatment is carried out at a temperature that is below, preferably at least 10 K below, the temperature of a final heat treatment step. If martensitic hardening is performed, the final heat treatment step is the tempering. In this case, the temperature of the final heat treatment step is the tempering temperature. If bainitic hardening is performed, the final heat treatment step is the bainitic transformation. In this case, the temperature of the final heat treatment step is the bainitic transformation temperature.

Since the outer ring 3 is subjected to lower loads (curvature-dependent lower Hertzian pressure), it is not necessary, although it is possible, to manufacture the outer ring 3 with the same specifications as the inner ring 1. In other words, the outer ring 3 can be manufactured from the same material and in the same manner as described above for the inner ring 1. Likewise it is also possible to utilize a steel for the outer ring 3 which has different specifications from those given for the inner ring 1. In addition, in the manufacturing of the outer ring 3 one or more processing steps which are given for manufacturing the inner ring 1 can be omitted. In particular, the outer ring 3 can be subjected to a hardening heat-treatment including a final heat-treatment step, a cold working, a bluing treatment, and/or a thermal post-treatment at a temperature below the temperature of the final heat-treatment step.

The rolling elements 5 are manufactured from a ceramic material. For example, conventional ceramics produced by a sintering process are suitable for this purpose, for example nitrite-based ceramics (silicon nitride being particularly common). Furthermore oxide ceramics, e.g., zirconium oxide, can be utilized. Likewise it is possible to utilize a ceramic material that is manufactured using a pyrolysis reaction method. For example, the methods described in EP1310469B1 and EP1331211B1 can be used. Here the ceramic can contain a predominantly crystalline or glasslike binder phase (e.g. silicon oxycarbide, silicon oxynitride) with reinforcing silicon carbide particles or aluminum oxide particles.

The cage 6 can be manufactured from a high-temperature-resistant plastic (high temperature plastic). A plastic can be considered to be a high-temperature plastic if it is still structurally stable, even at temperatures above 100° C., preferably above 150° C., so that the functioning of the rolling-element bearing is not impaired. For example, polyetheretherketone (PEEK) can be utilized as plastic. The cage 6 can also, e.g., be manufactured from polyamide (e.g. PA66), steel (e.g. steel plate), or brass.

If the rolling elements 5 are made of ceramic material, the above-described rolling-element bearing may exhibit one or more of the following exceptional properties:

For example, when used in a transmission of a wind turbine, the rolling-element bearing has a much longer service life than conventionally-used fully-steel rolling-element bearings. Depending on the situation in which they are installed, a tenfold increase in service life is quite achievable. The long service life is achieved due to the combination of the materials and the processing steps, in particular of the inner ring 1 and of the rolling elements 5. In most applications, the measures taken with respect to the outer ring 3 contribute to the prolonging of the service life to a lesser extent than the measures taken with respect to the rolling elements 5 and the inner ring 1.

The ceramic material of the rolling elements 5 distinguishes itself with respect to conventionally used steel materials by its much lower density and thus much lower mass, and the lower moment of inertia resulting therefrom. In this way the load on the cage 6 and also on the inner ring 1 and outer ring 3 is reduced. In addition, the rolling elements 5 are more easily made to rotate, and in particular slipping movements (slippage friction) between the rolling elements 5 and the inner-ring raceway 2 or the outer-ring raceway 4 are largely avoided. This has an especially favorable effect in particular in mixed-friction conditions, such as occur regularly in wind turbine transmission bearings. The lower coefficient of slippage friction between ceramic and steel, as compared to a steel-steel contact, also contributes to a reduction of tribological material damage due to slipping movements. Slippage movements also consequently have a considerably higher, e.g. abrasive or adhesive, wear than the desired rolling of the rolling-elements 5 on the inner-ring raceway 2 and the outer-ring raceway 4, in particular if the lubricant film formed between the rolling elements 5 and inner ring raceway 2 or the outer ring raceway 4 is interrupted or broken (e.g. with mixed friction).

If a direct contact between the rolling elements 5 and the inner-ring raceway 2 or the outer-ring raceway 4 can be largely avoided, friction and wear are substantially reduced. The advantage, e.g., for rolling-element bearings in transmissions of wind turbines, will become clear at this point by the fact that frictional tensile stresses are usually responsible in these applications for crack formation with premature failures. Furthermore, local wear (adhesive wear, smearing) as a result of steel-steel contact and the considerable associated surface damage can be avoided. In the absence of lubrication, these effects come into play to a particular degree.

Due to the reduced mass of the ceramic rollers as compared to steel, the risk of damage to the inner ring 1 and the outer ring 3 when (highly) dynamic loads occur is also reduced.

Another effect of the ceramic material is a reduced formation of hydrogen due to decomposition of the lubricant, as compared to rolling elements 5 made from steel, perhaps during operation when current is flowing (e.g. rolling-element bearings in generators). Penetrating hydrogen dissolves in the matrix of the steel material of the inner ring 1 and of the outer ring 2, thereby weakening the structure and promoting the formation of cracks. The risk of crack formation in particular due to compressive residual stresses near the surface is significantly reduced.

By utilizing a high-temperature plastic for the cage 6, a considerable reduction of the mass of the cage 6, as compared to steel or brass is achieved, without significant degradation of mechanical stability even at high operating temperatures. The loads generated by the cage 6 are thus reduced.

Since the ceramic material of the rolling elements 5 conducts electrical current more poorly than steel, a decomposition of the lubricant caused by current flow can be reduced or prevented.

The above-described properties of the inventive rolling-element bearing therefore also make it possible to reduce the demands placed on the lubricant used.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling element bearings, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Inner ring
2 Inner-ring raceway
3 Outer ring
4 Outer-ring raceway
5 Rolling elements
6 Cage
7 Blued layer

We claim:

1. A rolling-element bearing, comprising:
    an inner ring made of steel and having an inner-ring raceway,
    an outer ring having an outer-ring raceway and
    rolling elements made of a ceramic material, the rolling elements being rollable on the inner-ring raceway and on the outer-ring raceway,
wherein:
    the inner ring has been hardened by a heat treatment,
    the inner ring exhibits compressive residual stresses formed by cold working, which compressive residual stresses are in an outer layer in the region of the inner-ring raceway, the outer layer extending at least up to a minimum depth below the surface of the inner-ring raceway, and
    the surface of the inner-ring raceway is formed by a blued layer.

2. The rolling-element bearing according to claim 1, wherein the ceramic material of the rolling elements is manufactured by pyrolysis from a polymeric precursor.

3. The rolling-element bearing according to claim 1, wherein the inner ring is manufactured from a steel having a sulfur content of 0.002 to 0.015 mass % and/or an oxygen content of less than 15 ppm.

4. The rolling-element bearing according to claim 1, wherein the inner ring has a residual austenite content of 8 to 18 volume %.

5. The rolling-element bearing according to claim 1, wherein the compressive residual stresses have an absolute value of a minimum value or greater, and the minimum value of the absolute value is 200 MPa.

6. The rolling-element bearing according to claim 1, wherein the minimum depth is 0.1 mm.

7. The rolling-element bearing according to claim 1, wherein the compressive residual stresses have an absolute value of a maximum value or less, and the maximum value is 1500 MPa.

8. The rolling-element bearing according to claim 1, wherein the inner ring has a thermally modified microstructure in the outer layer.

9. The rolling-element bearing according to claim 1, wherein the outer ring has been subjected to a bluing treatment.

10. The rolling-element bearing according to claim 1, further comprising a cage made from a high-temperature plastic.

11. The rolling-element bearing according to claim 10, wherein:
    the inner ring is manufactured from a steel having a sulfur content of 0.002 to 0.015 mass % and/or an oxygen content of less than 15 ppm,
    the inner ring has a residual austenite content of 8 to 18 volume %,
    the compressive residual stresses have an absolute value of a minimum value or greater, and the minimum value is 200 MPa,
    the minimum depth is 0.1 mm,
    the compressive residual stresses have an absolute value of a maximum value or less, and the maximum value is 1500 MPa, and
    the inner ring has a thermally modified microstructure in the outer layer, and
    the ceramic material comprises silicon nitride or zirconium oxide.

* * * * *